(12) United States Patent
Elberbaum

(10) Patent No.: US 7,071,971 B2
(45) Date of Patent: Jul. 4, 2006

(54) APPARATUS FOR IDENTIFYING THE SCENE LOCATION VIEWED VIA REMOTELY OPERATED TELEVISION CAMERA

(75) Inventor: David Elberbaum, Tokyo (JP)

(73) Assignee: Elbex Video Ltd., Tokyo (JP)

( * ) Notice: Subject to any disclaimer, the term of this patent is extended or adjusted under 35 U.S.C. 154(b) by 914 days.

(21) Appl. No.: 10/043,897

(22) Filed: Jan. 9, 2002

(65) Prior Publication Data

US 2002/0152557 A1 Oct. 24, 2002

Related U.S. Application Data

(63) Continuation-in-part of application No. 09/918,220, filed on Jul. 30, 2001.

(51) Int. Cl.
*H04N 5/232* (2006.01)

(52) U.S. Cl. .................. 348/211.11; 348/143

(58) Field of Classification Search ........... 348/211.11, 348/335, 143
See application file for complete search history.

(56) References Cited

U.S. PATENT DOCUMENTS

| | | | |
|---|---|---|---|
| 3,472,951 A | 10/1969 | Shimada et al. | |
| 5,005,083 A | 4/1991 | Grage et al. | |
| 5,220,429 A | 6/1993 | Bergvall | |
| 5,335,014 A | 8/1994 | Elberbaum | |
| 5,412,418 A | 5/1995 | Nishimura et al. | |
| 5,455,632 A | 10/1995 | Ichihara | |
| 5,574,497 A * | 11/1996 | Henderson et al. | 348/144 |
| 5,583,565 A | 12/1996 | Cortjens et al. | |
| 5,654,750 A | 8/1997 | Weil et al. | |
| 5,659,369 A | 8/1997 | Imaiida | |
| 5,777,663 A | 7/1998 | Shibata et al. | |
| 5,862,218 A | 1/1999 | Steinberg | |
| 5,892,855 A | 4/1999 | Kakinami et al. | |
| 6,073,192 A | 6/2000 | Clapps et al. | |
| 6,215,519 B1 * | 4/2001 | Nayar et al. | 348/159 |
| 6,591,064 B1 * | 7/2003 | Higashiyama et al. | 396/18 |

FOREIGN PATENT DOCUMENTS

| | | |
|---|---|---|
| JP | WO 89/02203 | 3/1989 |
| JP | 7-231442 | 8/1995 |

* cited by examiner

*Primary Examiner*—Tuan Ho
(74) *Attorney, Agent, or Firm*—Katten Muchin Rosenman LLP

(57) ABSTRACT

An apparatus for identifying location of a scene which is viewed via a remotely operated system includes a first TV camera operated to observe a scene through a narrow angle lens and a second TV camera to observe the scene through a wide angle lens. At least the first TV camera has a dual mode image pick up device which executes either color mode or a black and white mode. Both TV cameras are moved co-jointly. The apparatus has a processor which combines video signals generated by both TV cameras. At least one of the TV cameras has a switchover unit which switches the modes of the image pick up device from one mode to another and back. The processor activates the switching from one to another mode by comparing video signals generated by the first and second TV cameras with a reference signal.

60 Claims, 8 Drawing Sheets

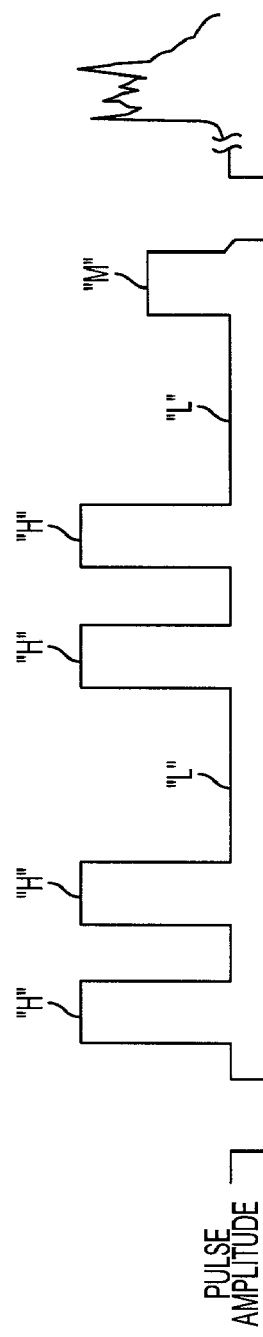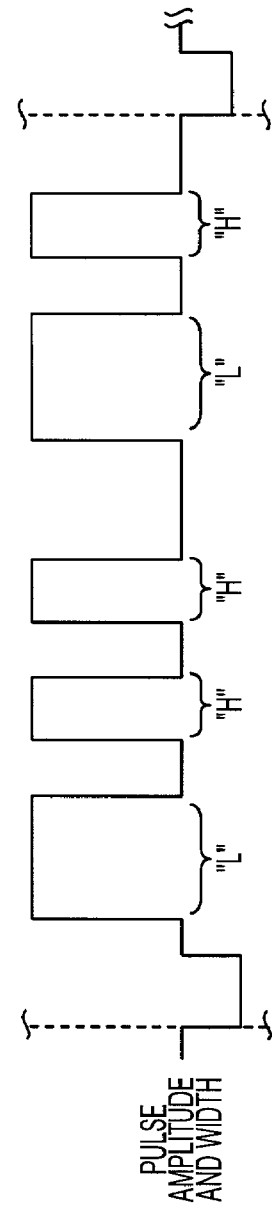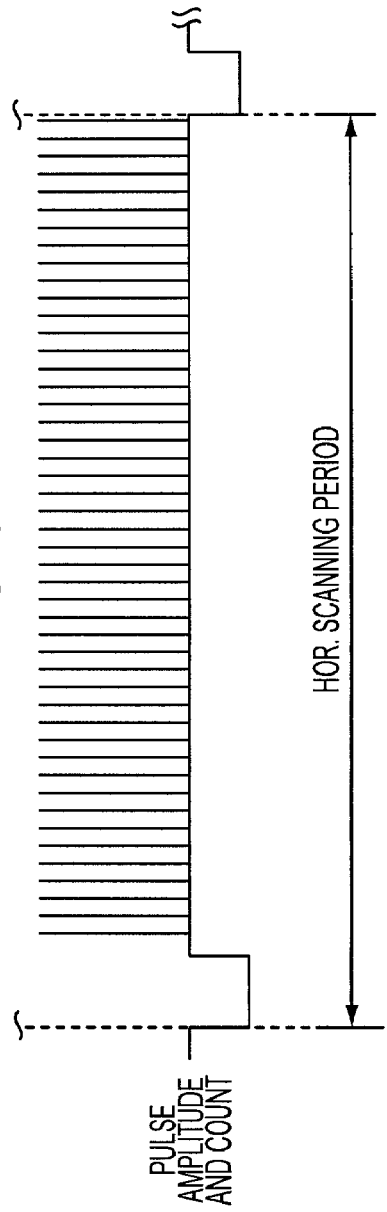

APPARATUS FOR IDENTIFYING THE SCENE LOCATION VIEWED VIA REMOTELY OPERATED TELEVISION CAMERA

CROSS-REFERENCE TO RELATED APPLICATION

This application is a continuation-in-part application of application Ser. No. 09/918,220 filed Jul. 30, 2001.

BACKGROUND OF THE INVENTION

1. Field of the Invention

This invention relates to a remotely controlled television camera provided for observation, monitoring and/or recording of its surrounding scenes.

2. Description of the Prior Art

A remotely controlled television camera used for observation of its surrounding scenes is normally mounted on a remotely controlled pan-tilt head and is equipped with a remotely controlled motorized zoom lens. The operator, remotely controlling the positioning of the camera for monitoring people and other objects, may have on occasion difficulties in identifying the position to which the lens of the camera is directed, especially when the zoom lens is set to its telephoto state. This is because the angle of view of the telephoto lens is narrow and this magnifies the observed scene, displaying only a small portion of the entire view, thereby removing recognizable or identifiable landmarks from the display. Therefore, an operator viewing such magnified scene from a crowded sport stadium becomes confused and does not know to which direction to pan or tilt the camera in order to find an object he intends to monitor.

On the other hand, observing the scene via the wide angle lens provides the operator with the wide overall view, which makes it possible to identify the direction of the lens. Therefore an operator of a remotely controlled television camera attempting to focus on a specific object repeatedly shifts the motorized zoom lens of the camera back and forth from telephoto to a vide angle in order to identify the camera direction and coordinate which is laborious and time consuming, and results in an inefficient observation process.

Some remotely controlled television cameras may further comprise a switchover circuit and a mechanism to switchover a camera head from color observation of well-illuminated areas during daytime to black/white observation of low level illuminated areas during nighttime. The circuit for a return switchover back from night to day observation requires a manual command by an operator, because the camera illumination sensing circuits fed by black/white signals cannot precisely identify when the observed area is sufficiently illuminated for color observation. In large systems, such manual recall command to return many cameras back to color observation is inefficient, laborious and time consuming.

SUMMARY OF THE INVENTION

An object of the present invention is to insert a small size picture showing the wide view of the observed scene into the main display showing a magnified small portion of the scene, thereby displaying a picture in picture that acts as a wide angle view finder. Another object of the present invention is to insert a small size picture showing a magnified small portion of the scene into the main display showing a wide view of the observed scene, thereby displaying a picture in picture that provides a view, similar to what is known as an eagle view. This will provide for an operator of a remotely controlled camera the means to identify the observed magnified location, through a wide angle picture insertion on the one hand and, on the other hand, the means to enlarge only a limited portion of a wide-angle scene display.

The apparatus for identifying the scene location according to the present invention comprises at least one remotely controlled television camera system incorporating two camera heads, each equipped with separate picture forming circuits and separate lens, with both lenses directed at the same target. One of the television camera heads is fitted with a motorized zoom lens, while the other is fitted with a wide-angle lens. Alternatively both television camera heads may be fitted with motorized zoom lenses. It is further possible to fit one of the television camera heads with a fixed angle telephoto lens and the other with a wide-angle lens.

The remotely controlled television camera system employs a central processing unit (CPU) for receiving control signals through the coax cable propagating video signals, or via twisted pair wires or via a fiber optic cable, and a driver for providing the pan-tilt movement, driving the motorized zoom lens and/or controlling all the other camera functions including the controlling of the picture in picture forming process. Alternatively, it is possible to operate the television camera system without a CPU, in which case the controls can be transmitted to the television camera system via a multi core cable for controlling all different functions or group of the functions of the television camera system individually through the driver.

The combining and forming of the signals fed from the two camera heads into a mixed picture in picture signal is processed by a well known P.I.P circuit I.C, such as I.Cs used in multi display television receivers or by well known video memory I.Cs circuits that are used for forming split and multi video displays. The mixed picture in picture signals are transmitted from the television camera system through a transmission line such as coax cable, twisted pair communication wires or via a fiber optic cable to a monitor for displaying the combined picture in picture. The mixed picture in picture signals can also be propagated from the television camera system through a controller to the television monitor.

The CPU circuit of the television camera system comprises a control signal detector for receiving and detecting control commands generated by a control unit and propagated via the video transmission line or via a separate control line. The CPU further comprises drive circuits for driving different functions of the television camera system, such as pan left or right, tilt up or down, zoom tele or wide, focus far or near, as well as switching the picture in picture processing circuit on-off and selecting one of the two camera heads to generate the main telephoto picture display, while the other camera head provides the wide view picture for insertion into the main picture, thereby providing the wide view range finding into the main display. Alternatively and upon command, the CPU selects the wide view camera head signal for the main picture and the signal from the telephoto camera head for the insertion of the smaller picture. The insertion telephoto picture becomes the magnified display of a small portion of the wide-angle picture, providing a display similar to the eagle view.

The telephoto or the magnified picture inserted into the main wide angle picture is positioned in the display center, providing the operator with simple means to continuously observe a magnified small portion of the entire display while controlling the pan-tilt head movement. Alternatively, it is possible to shift the inserted picture position within the display in order to correct minor target errors or to prevent obstruction of important portions of the main, wide view display. Similarly it may be necessary to shift an inserted wide angle picture that is used for view finding in order to prevent obstruction of important details in the observed main telephoto picture display.

To shift the inserted picture position within the main picture area the controller is provided with shifting control commands for shifting the position of the inserted picture and the P.I.P circuit of the television camera system will reposition and memorize the new picture in picture position.

The controller comprises a control command generator for generating control signals such as serial digital codes or binary codes or analog on-off signals for operating the pantilt head and the zoom lens and/or for switching on-off the picture in picture circuit, selecting which of the two camera heads signals will be processed as the main display and P.I.P shifting-positioning.

According to the present invention the two camera heads can share common clock oscillator and internal synchronizing generator, alternatively each of the camera heads can operate with its own individual clock oscillator and internal synchronizing generator. When the two camera heads each comprise and operate with an individual clock oscillator and internal synchronizing generator it is preferable to externally synchronize and mutually lock the internal synchronizing generators of both camera heads, along with synchronizing the entire television camera system. Thereby an uninterrupted synchronizing process is ensured during and immediately after the selection of the television camera system, selection of the P.I.P and P.I.P switching on-off process.

Any of the well known external synchronization methods such as composite sync (genlock), or vertical drive (VD), or horizontal drive and vertical drive (HD/VD), or line lock can be used. However, since the aforementioned external synchronization methods require an additional transmission line to be extended between the television camera system and the controller, the television camera system of the present invention uses another known apparatus for synchronizing a plurality of television cameras, which is an apparatus for transmitting an external synchronizing signal from an external synchronizing generator to the television cameras by injecting the external synchronizing signal into the video signal transmission line and locking an internal synchronizing signal generator of the television camera by means of the transmitted external synchronizing signal. Such apparatus is disclosed in U.S. Pat. No. 4,603,352, the entire contents of which are incorporated herein by reference.

According to the present invention, the external synchronizing signal is a pulse signal having a voltage level higher than the maximum voltage level or lower than the minimum voltage level of the video signal. The controller includes a circuit for injecting the external synchronizing signal into a transmission line connecting the television camera system and the controller. The television camera system includes a level comparator circuit for extracting the external synchronizing signal by comparing the signal level of the external synchronizing pulse signal with a reference signal having a predetermined voltage and feeds the extracted external synchronizing signal to the internal synchronizing generator of each camera head individually, or to a common internal synchronizing generator when both camera heads are mutually connected to a common internal synchronizing generator.

Since the external synchronizing pulse is generated during the vertical blanking period of the video signal, the external synchronizing signal can be transmitted commonly through the same transmission line used for transmitting the video signal without affecting the video signal.

In an embodiment, the controller may preferably include a circuit for removing the external synchronizing signal from the output signal fed from the controller to a monitor, video recorder or other video receiving means.

Thereby, since the external synchronizing signal can be removed from the output video signal fed from the controller, the external synchronizing signal does not influence the input circuits of the receiving means and the video signal can be flawlessly received.

In an embodiment, each television camera system may further include an identification code generation circuit for generating an identification code signal corresponding to an identification number, respectively allotted to each television camera system, for injecting the identification code signal into the video signal fed to the controller. The controller may further include an identification code signal processing means for extracting the identification code signal from the video signal fed from the television camera system and for feeding the extracted identification code signal to the control code generating circuit for combining the identification code signal with the control code signal.

The apparatus of the present invention may further comprise a control means for generating and feeding a control signal combining a coded control command along with the identification code signal, decoded and fed by the extraction circuit, for controlling the television camera system. The combined coded control command is fed by the controller to the television camera system through the video transmission line connecting the controller and the television camera system. The television camera system may further include a control signal processing means for extracting the control signal from the video transmission line and for feeding the extracted control signal to the drivers of the television camera only when the identification code signal which is combined into the control signal, corresponds to the identification code allotted to the television camera system being controlled. Thereby, the specific television camera system having its identification code extracted and decoded by the controller during the controlling process, can have its allotted identification number coincide with the identification code extracted from the control signal fed from the control means. Therefore, the specific television camera system can be verifiable and be accurately controlled.

The control signal is injected into a video transmission line connecting the television camera system to the controller during the vertical blanking period of the video signal. Since the control signals are transmitted during the blanking period of the video signal they can be transmitted to the television camera system from the controller through a common transmission line without disturbing the video signal.

The controller may further include a memory circuit for storing data pertaining to the identification code of each of the television camera systems and a superimposing circuit for retrieving the data from the memory and superimposing numeric, text or graphics onto the displayed picture on the basis of the decoded identification signal.

The superimposing circuit may also incorporate graphic signs such as crosshatch or target mark for identifying the centers or other positions of the picture in picture, thereby providing the operator with the precise position identifier.

The television camera system may further provide a similar superimposing circuit for superimposing graphic signs into the video signals, thereby providing, upon command received from the controller, a target marker into the picture in picture.

The first television camera head, equipped with a motorized zoom lens or telephoto lens, may be a switchable camera head for generating two different video signals, such as color signals for well-illuminated scenes and black/white signals for dark scenes, similar to well known day-night or color-black/white switchable cameras. Color CCD requires higher illumination than black/white CCD for outputting proper level video signals and moreover, color pickup CCD devices require the use of optical filters that limit the exposure of the CCD to visual spectrum only and block other extended light rays, such as IR, from reaching the pickup device.

Therefore, the one method to switchover the camera head from day to night observation is the removal of the filter in front of the CCD by a motorized mechanical device. This method of the filter removal enables the removal of a filter such as IR cut filter and the use of IR illuminators at night, thereby enabling the color CCD to operate in IR illuminated environment and to output black/white video signals.

The first television camera head of the apparatus for identifying the scene location according to the present invention may further comprise a switchable day-night method by employing two separate CCD devices, a color CCD for day observation and black/white CCD for night or dark observation.

Each of the two employed CCDs may further comprise its own filter to perfectly operate within a given environment visual spectrum or beyond and the switchover from color to black/white surveillance is similarly activated via motorized action upon the operator's command, or automatically by a sensing circuit that compares the observed signal levels to a given reference or a threshold level.

In large systems in which many remotely controlled cameras are employed and recorded continuously, a manual command for returning to color observation is impractical, because the operator is unable to attend to all the cameras of the system and to check their different areas of observation and to switch each camera over from black/white to color one by one. For such large system applications the auto return switchover from nighttime observation to daytime observation, or from black/white to color observation is necessary.

The sensing circuit for the switchover from day to night observation is carried by a simple threshold level sensing circuit associated with the first camera head and with a driver circuit that drives a CCD switchover mechanism or a filter removal mechanism. The sensing circuit generates a switchover command to the switchover driver circuit to switch the camera to the night or dark scene observation whenever the level sensing circuit identifies a scene that is generating a signal lower than a selected threshold level.

The problem of such setup is that once the camera head is switched over to observe dark scene using black/white CCD and/or IR illuminators, it may well generate a signal that is larger than a sensing signal reference or threshold. Therefore, to prevent a repeated switchover back and forth from the night to day observation and from the day to night observation, the sensing device of the apparatus for identifying the scene location of the present invention further processes the signals generated by the second camera head, with the wide angle lens, to identify the overall illumination level of the entire observed area and to switchover the first camera head back to color observation only when the signals of both camera heads are higher than a reference threshold.

BRIEF DESCRIPTION OF THE DRAWINGS

The foregoing objects and features of the present invention will become apparent from the following description of preferred embodiments of the invention with reference to the accompanying drawings, in which:

FIGS. 6A–6C show waveforms of an identification code signal;

DETAILED DESCRIPTION OF THE PREFERRED EMBODIMENTS

Figure 1:
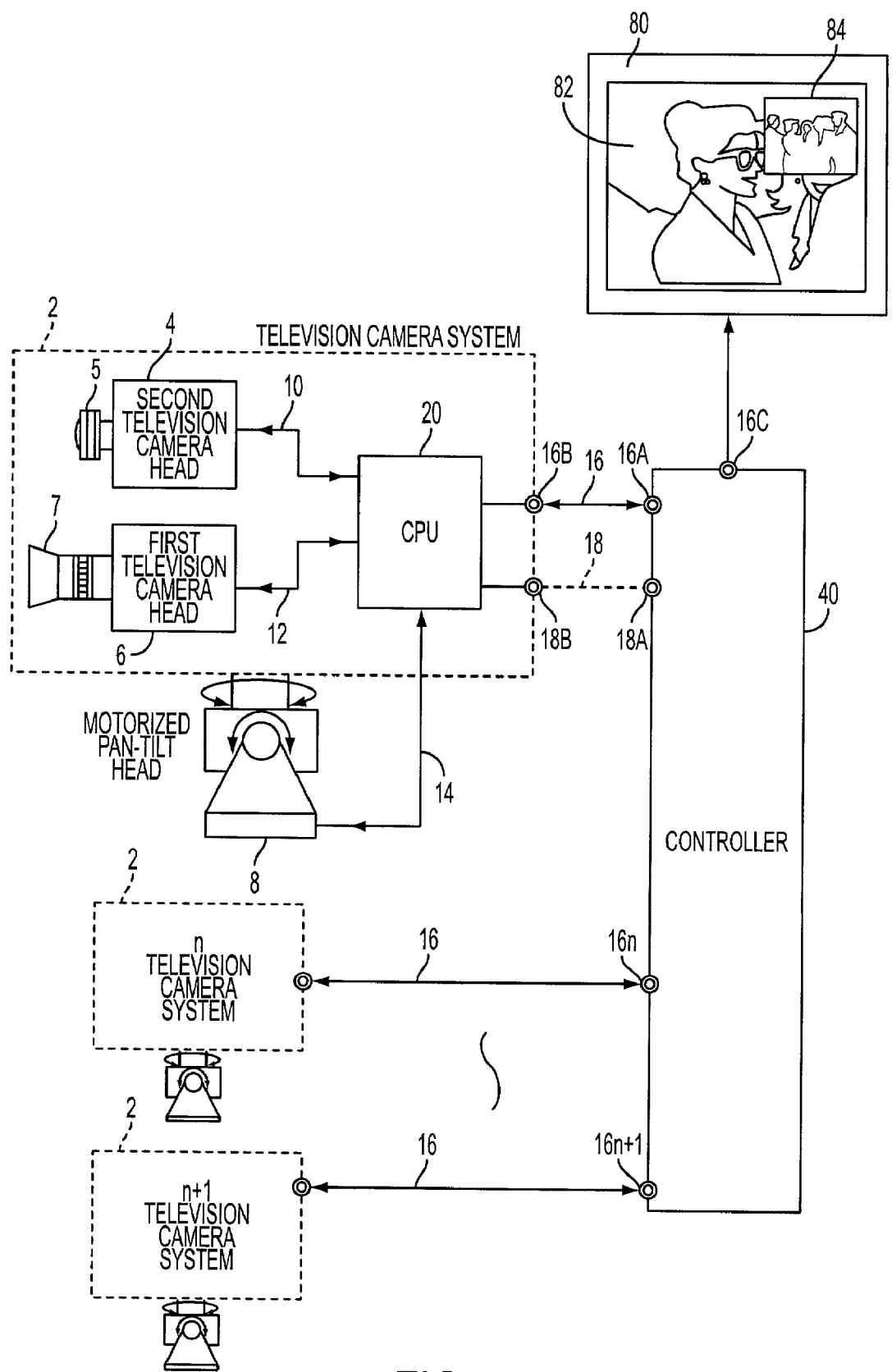
FIG. 1 is a block diagram of an apparatus for identifying scene location viewed by a television camera system of a preferred embodiment of the present invention.
Figure 2:
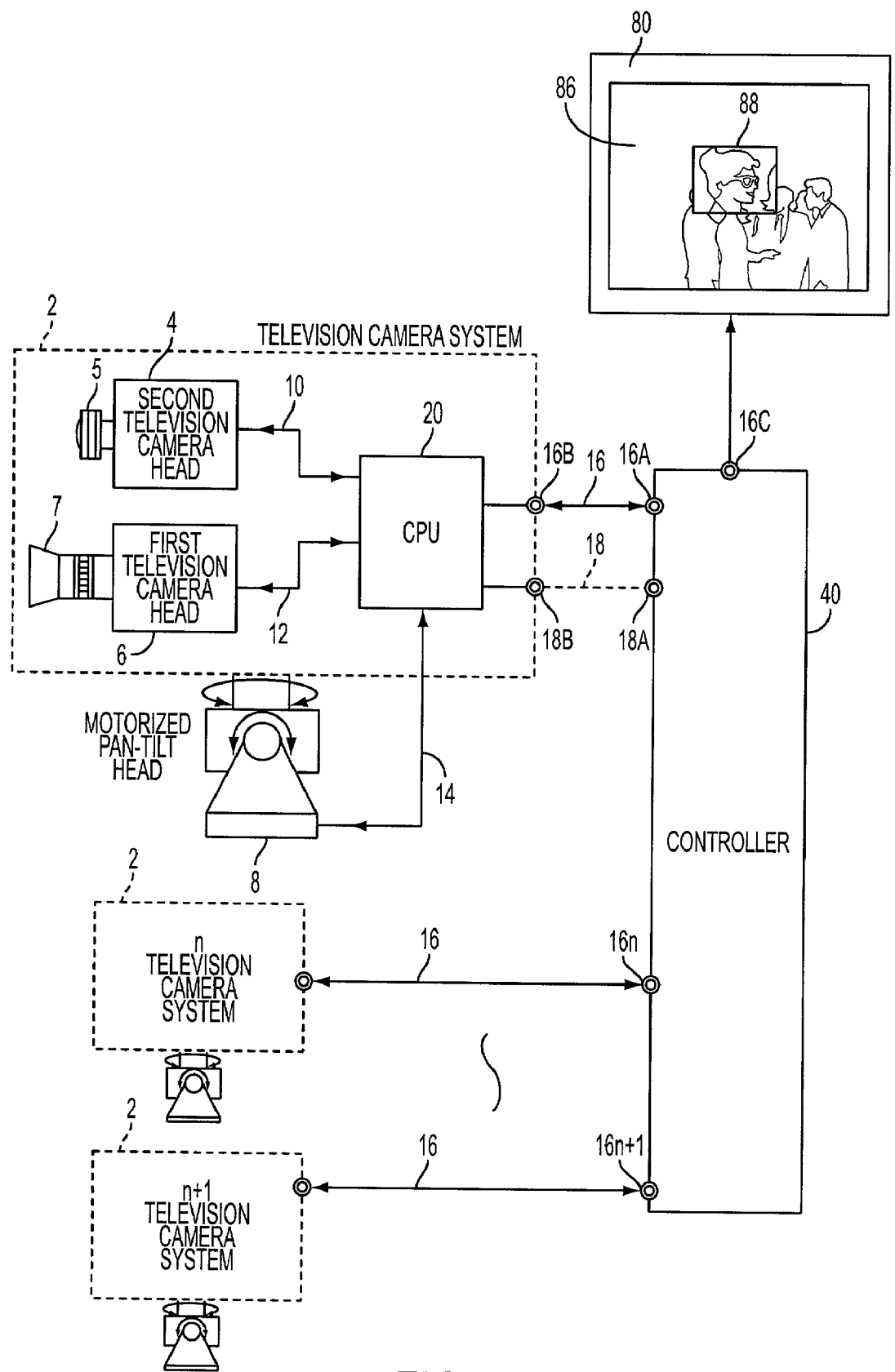
FIG. 2 is another block diagram of the apparatus of FIG. 1, showing a magnified portion of a wide angled scene viewed by a television camera.

As shown in FIG. 1 the apparatus of the present invention includes at least one remotely operated television camera system 2 for identifying the scene location, as a preferred embodiment, when applying the present invention to a close circuit television monitoring system. A plurality of television camera systems may be provided in the apparatus as shown in FIGS. 1 and 2. Live reference numerals designate like structural components throughout the specification. A video signal in the following description may consist of the video signal only, or a combination of video, audio and/or code signals propagated from the television camera system 2 to a controller 40 along with control and/or audio signals propagated from the controller 40 to the television camera system 2. The video signal in the following description may be a video portion of a composite video signal or a composite video signal or a digital video signal.

The apparatus shown in FIG. 1 for identifying the scene 82 location seen on a screen of a monitor 80 comprises the television camera system 2 for transmitting a video signal and receiving a control signal and an external synchronizing signal through a transmission line 16 connecting the television camera system 2 to controller 40, the monitor 80 for displaying scene 82 observed by a 1st television camera head 6 of the television camera system 2.

The television camera system 2 is mounted on, or incorporates a built-in motorized pan-tilt head 8 that is remotely operated by the controller 40 through a transmission line 16 and processed by a central processing unit (CPU) 20 of the television camera system 2 and driven via a control line 14.

The controller 40 may be connected via other transmission lines 18 through its terminal 18A directly to a terminal 18B of the television camera system 2 for propagating control signals to the CPU 20.

The television camera system 2 comprises two television camera heads 4 and 6, of which the first television camera head 6 is fitted with a narrow angle or magnified lens 7 and is connected via a connection line 12 to the CPU 20 while the 2nd television camera head 4 is fitted with a wide angle lens 5 and is connected to the CPU 20 via a connection line 10. Both television camera heads 4 and 6 are optically targeted toward the same observation point.

The monitor 80 is connected to an output terminal 16C of the controller 40 and displays the magnified narrow angle scene 82 observed by the first television camera head 6 through its motorized zoom lens 7, and a second picture 84 inside the 1st or main scene picture 82. The wide angle picture 84 generated by the 2nd camera head 4 through its wide angle lens 5, inserted into the main magnified scene 82 serves as a wide angle view finder for the operator controlling the system via controller 40.

FIG. 2 shows the same apparatus as in FIG. 1 with the exception of the pictures observed on the screen of the monitor 80. The wide angle picture generated by the television camera head 4, which is shown in FIG. 1 as the small inserted picture 84, is displayed in FIG. 2 as the main picture 86 occupying the entire screen of monitor 80.

The small inserted magnified picture 88 which is positioned in the center of the main picture 86 is the picture generated by the television camera head 6, shown in FIG. 1 as the main scene picture 82.

The reversing of the picture in picture positions provides the operator of the controller 40 with an eagle view display, whereby the center position of the wide angle picture is magnified through a telephoto lens.

Figure 3:
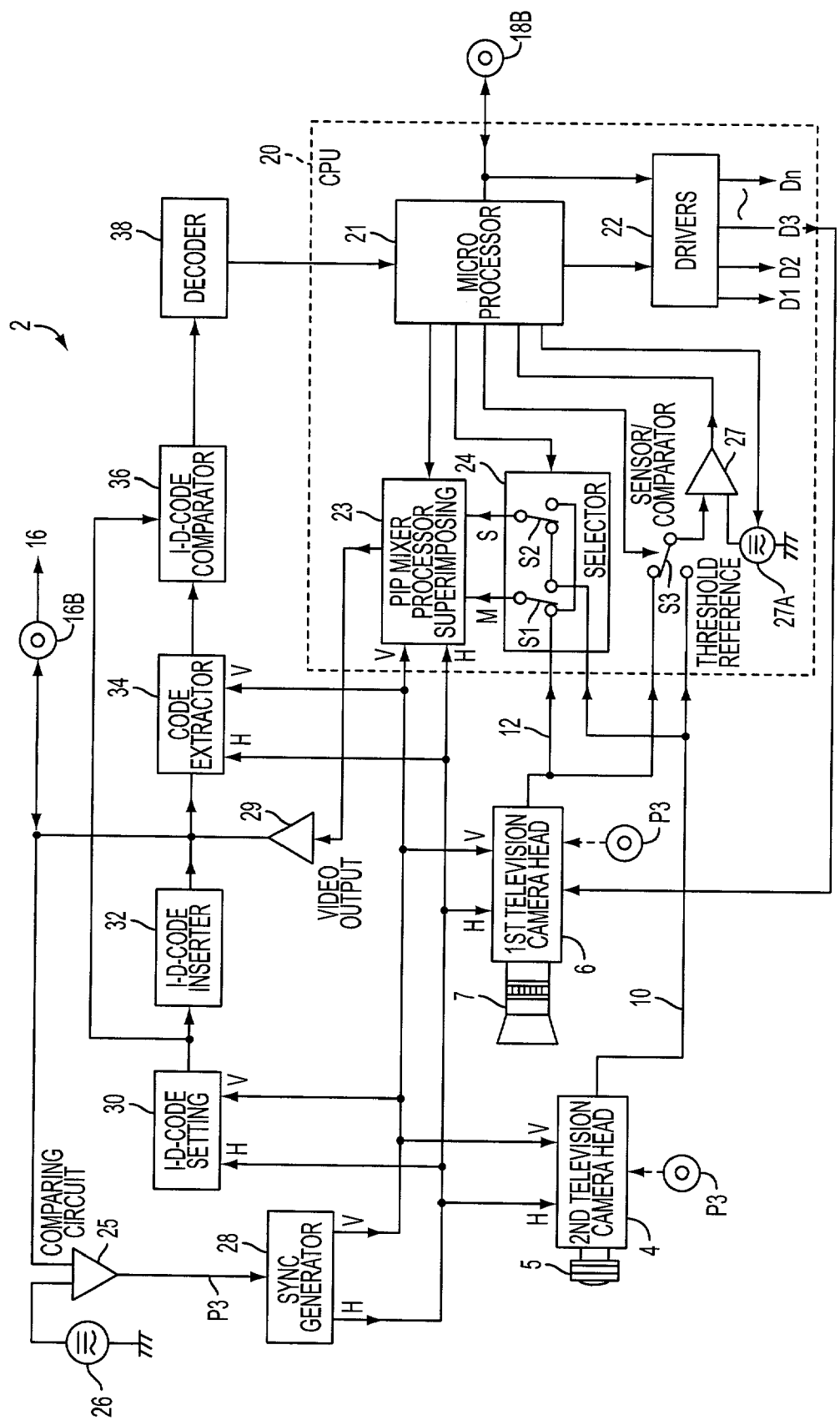
FIG. 3 is a block diagram of an electric circuit of the television camera system of the apparatus shown in FIG. 1.

FIG. 3 shows the television camera system 2, which includes an internal synchronizing signal generation circuit or generator 28, which drives both television camera heads 4 and 6. The internal synchronizing generator is externally synchronized through a comparing circuit 25, which feeds the synchronizing signal generator 28 with pulse P3. Pulse P3 is similar to pulse P1 shown in FIG. 5A in its level and polarity; however Pulse P3 may have varying levels and/or opposite polarity in order to accommodate the operating levels and polarity of the external synchronizing input terminal of the internal synchronizing signal generator 28.

The frequency of external synchronizing signals P1 and P3 is related to the vertical frequency of the video signal generated by the television camera system 2, preferably having a frame or field scanning frequency. For instance, in the case of an NTSC system, the frame frequency is 30 Hz, and the field frequency is 60 Hz. In such case, the frequency of the external synchronizing pulse P1 is either frame frequency of 30 Hz or a field frequency of 60 Hz.

Figure 5A:
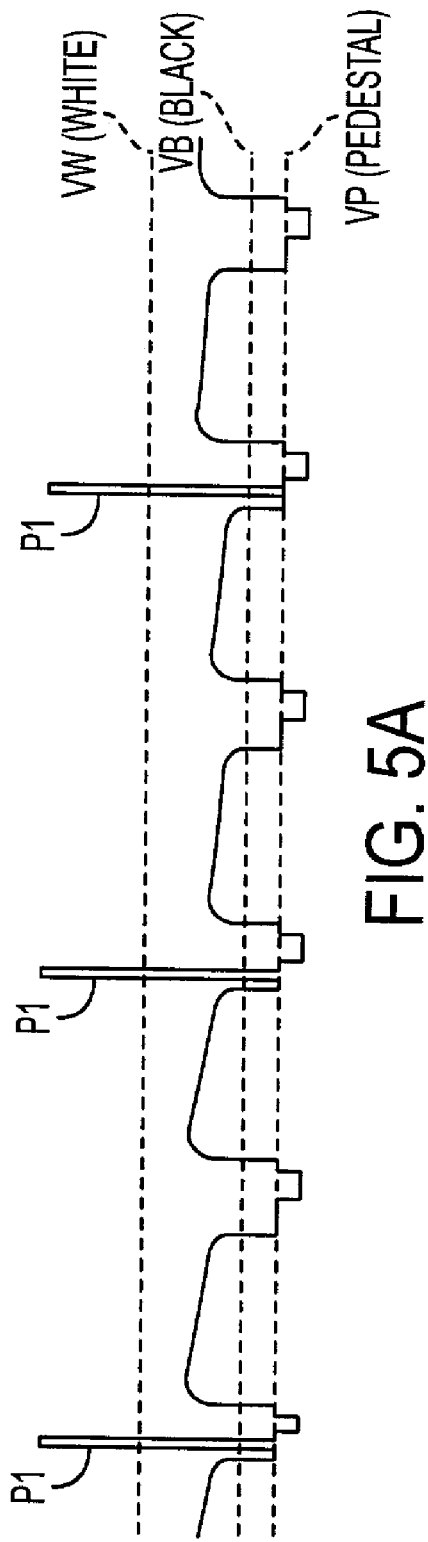
FIGS. 5A–5C show waveforms of a signal propagated by the apparatus of FIG. 1.

As shown in FIG. 5A, the time the external synchronizing signal P1 is generated adjoins the vertical synchronizing pulse, occurring during the vertical blanking period of the video signal transmitted from the television camera system 2. Thereby, the external synchronizing signal P1 can be propagated to the television camera system 2 through the common transmission line 16 transmitting the video signal without affecting the video signal. The voltage level of the external synchronizing signal P1 is preferably made higher than the white level VW of the video signal. However, the voltage level of the external synchronizing signal P1 may be lower than the level of the sync of the composite video signal.

In the following description, a frame external synchronizing pulse having a voltage level higher than the white level of the video signal, in particular, a frame external synchronizing pulse corresponding to the phase of a second field is used as the external synchronizing signal P1.

If one or both camera heads 4 and 6 incorporate an individual internal synchronizing generator, the Pulse P3 must be fed from the comparing circuit 25 to the one or both camera heads 4 and 6 in order to externally synchronize and lock each individual internal synchronizing generator and all the internal synchronizing generators to each other.

Figure 4:
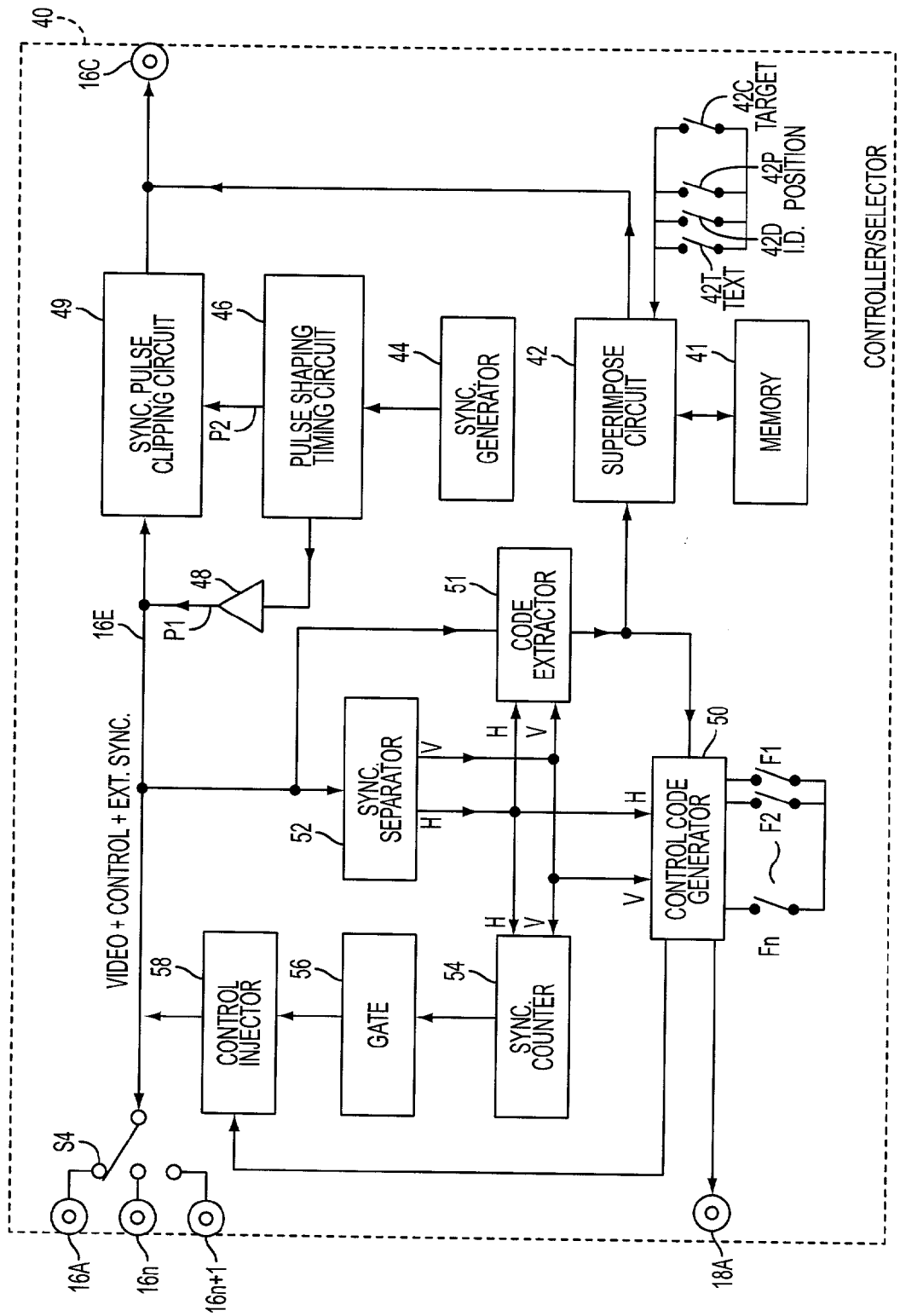
FIG. 4 is a block diagram of an electric circuit of a controller of the apparatus shown in FIG. 1.
Figure 5B:
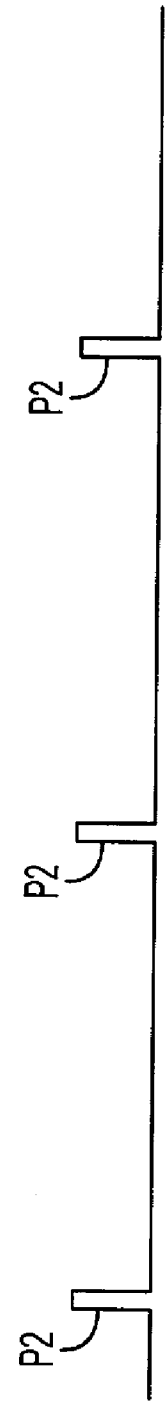

As shown in FIG. 4, the controller 40 incorporates a pulse shaping timing circuit 46 for outputting a pulse signal P2 shown in FIG. 5B synchronized with the external synchronizing signal P1 fed from an external synchronizing signal generation circuit 44. The pulse shaping timing circuit 46 outputs both the pulses signal P2 and the external synchronizing signal P1. An external synchronizing signal injection circuit 48 receives the pulse signal P1 fed from the pulse shaping timing circuit 46 and injects the pulse signal P1 into a video signal line 16E. A synchronizing pulse clipping circuit 49 is provided for clipping the synchronizing pulse P1 from a signal fed from the video signal line 16E and passing through the synchronizing pulse clipping circuit 49, by using the timing signal P2 to clip the pulse P1 and feed a video signal containing no synchronizing pulse P1 to the output 16C of the controller 40.

Figure 5C:
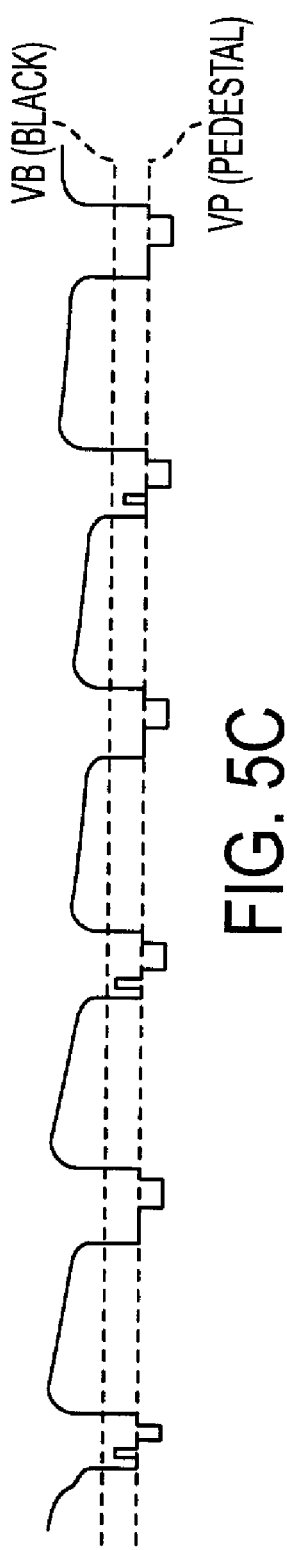

The synchronizing pulse clipping circuit 49 is fed with the signal shown in FIG. 5A from the video signal line 16E and the timing signal P2 shown in FIG. 5B from the pulse shaping timing circuit 46. The signal P2 activates the clipping circuit 49 for the duration of P2, thereby the clipping circuit 49 clips the entire signal portion of the signal fed to its input terminal above the black level Vb of the video signal during the period of signal P2. Since the duration of P2 covers the period of the external synchronizing pulse P1, the external synchronizing signal P1 is removed by the clipping circuit 49 from the composite video signal to be fed to a receiving apparatus through output terminal 16C, as shown in FIG. 5C.

Accordingly, even though the external synchronizing signal P1 is present in the video signal fed from the television camera system 2 through the transmission line 16 it is removed by the clipping circuit 49; therefore, the external synchronizing signal P1 injected into the video signal line 16E will synchronize the television camera system 2 and will not cause any receiving error by receiving apparatuses.

Referring again to FIG. 3, the television camera system 2 also includes a reference voltage source 26 which feeds a reference signal to the comparing circuit or voltage comparator 25 for separating the external synch pulse by comparing the voltage level of the external synchronizing signal P1 transmitted from the controller 40 through the video signal transmission line 16 with the reference signal and generating a pulse signal P3 when P1 level is same or larger than the reference signal. The internal synchronizing signal generation circuit 28 generates internal synchronizing signals H and V synchronized with the pulse signal P3 fed from the voltage comparator 25 for feeding the 1st camera head 6, and the 2nd camera head 4 and a PIP mixer processor and superimpose circuit 23 in order to generate video signals synchronized with the internal synchronizing signals H and V. When the pulse P1 is a pulse having the level lower than the level of the sync pulses contained in the composite video signal a different reference signal voltage and polarity source 26 will be selected.

The PIP mixer processor and superimposer circuit 23 consists of well known PIP ICs and superimposer ICs commonly available for a television receiver and other video or PC display equipment for generating picture in picture, or multi pictures displays along with text, numerics and graphic signs and other symbols.

The television cameras system 2 is allotted an identification number for generating respectively an identification code made of numbers such as 1, 2, 3 . . . n, for injecting the identification code into the video signal during the vertical blanking period.

The television camera system 2 incorporates a circuit for generating code signals corresponding to the identification code, and a circuit for generating a composite signal wherein the code signals are injected into the video signal. Such an apparatus is disclosed in U.S. Pat. No. 4,943,864, the entire contents of which are incorporated herein by reference; thereby, each of the video signals received by the controller 40 incorporates the specific allotted identification code.

The controller shown in FIG. 4 can be connected directly to the television camera system 2 via transmission line 16 or it can be connected to multiple television camera systems via a plurality of transmission lines 16 shown in FIGS. 1 and 2 and a selector switch S4 shown in FIG. 4. Such commonly available video selector switch or matrix switches are well known switches used for closed circuit television systems. Each time the operator switches over the selector from one television camera system to another the controller receives a video signal incorporating another identification code allotted to the newly selected television camera system.

The controller 40 further includes a control code generator 50 for generating a control signal for controlling the television camera system 2. The controller 40 also includes a synchronizing separator circuit 52 for separating the horizontal and vertical synchronizing signals H and V from the video signal transmitted through the video signal line 16E. The control code generator 50 generates a control signal for operating the television camera system 2 during predetermined timing on the basis of the separated synchronizing signals H and V and on the basis of function commands generated through switches F1, F2 and Fn. The coded commands are individually generated by the switches F1, F2 and up to Fn, such as pan left or right, tilt down or up, zoom tele or wide, focus near or far, P.I.P on or off, P.I.P shift left or right or up or down and select 1st camera head or 2nd camera head for displaying the main picture. Alternatively, the command may select display of the 1st camera head only or the 2nd camera head only, or command may select the first camera head to be switched-over from color to the black/white observation. The control signal generated by the control code generator 50 is fed to a control signal injector 58 for injecting the control signal into the video signal line 16E.

A sync counter 54 is provided for counting the number of horizontal scanning lines fed from the sync separator circuit 52 during each frame or field and for feeding the gate circuit 56 with gate-on signal when the counted value of the counter 54 is a predetermined value and the gate 56 switches on the control signal injector 58 for the duration of the gate-on signal, thereby injecting the control signal fed from the control signal generator circuit 50 into the video signal line 16E.

In the preferred embodiment of the present invention, the injector circuit may include a mixer circuit wherein the code signals are mixed and injected into the composite video signal. Such a mixer circuit is disclosed in U.S. Pat. No. 4,989,085, the entire contents of which are incorporated herein by reference, or it can be an injection circuit disclosed in U.S. Pat. Nos. 5,335,014 and 5,579,060 the entire contents of which are incorporated herein by reference.

The control command fed to the television camera system 2 through the transmission line 16 from the controller 40 may further include a control code command such as switching crosshatch or target marker on-off, wiper on-off, washer on-off or the like, or a start or stop command of the transmission of a video signal. The control signal combines the control code corresponding to the control command and the identification code respectively allotted to the television camera system 2. In addition, the control signal is injected into the video signal transmission line 16E by the control signal injector 58 at a predetermined time within the vertical blanking period. The injection timing of the control signal into the video signal line 16E is different from the injection timing of the external synchronizing signal into the video signal line 16E.

The control line 18 may be connected individually to the television camera system 2 via several control lines or connected in common to a plurality of television camera system 2 up to 2n. When the control line 18 is commonly connected to a plurality of television camera systems each of the television camera system 2 includes an identification code extractor for limiting the activating of the control driver 22 shown in FIG. 3 only when the identification code incorporated in the control code is identical to the identification code of the specific television camera system 2 being controlled, by using the code extraction circuit shown in detail in FIG. 7. Further, the control command can be directly transmitted from the controller 40 to each television camera system 2 or by direct connection to driver 22 of each television camera system 2.

It is apparent from the above description that both the external synchronizing signal and the control signal can be transmitted from the controller 40 to the television camera system 2 through the respective video signal transmission line 16.

However, the control signal composed of the control code and the identification code can be transmitted to the television camera system 2 through a separate control transmission line 18 instead of the video signal transmission line 16 by using multi core cable for operating individually each function, alternatively a twisted pair transmission line or optical fiber transmission line can be used for transmitting the control signals directly to the television camera system 2. Similarly, the external synchronizing signal P1 may be transmitted to the television camera system through a separate transmission line, using coax cable, twisted pair or optical fiber transmission lines. In such case the comparator circuit 25 of FIG. 3 is not necessary.

As shown in FIG. 3, each television camera system 2 further includes an identification code setting circuit 30 for generating an identification code respectively allotted to the television camera system 2 at a predetermined time within the vertical blanking period of the composite video signal on the basis of the internal synchronizing signals H and V, and an identification code injection circuit 32 for injecting the identification code fed from the setting circuit 30 into the video signal transmission line 16.

The timing of the identification code injection into the video signal transmission line 16 by the injection circuit 32 is different from the timing the control signal is injected into the video signal transmission line 16 by the controller 40 shown in FIG. 4. The control signal is injected into the video signal transmission line 16 by the controller 40 during the vertical blanking period of the composite video signal, while the identification code is injected into the video signal transmission line 16 by the television camera system 2 during one or more predetermined different horizontal scanning lines during same or another vertical blanking period of the composite video signal.

Identification code signals are shown in FIGS. 6A~6C. The identification code signal is a binary code or a bar code signal having two or more levels composed of a high level or white, which is the maximum or highest level of the picture signal in the video signals, a low level or black, which is the lowest level of the picture signal, and a median level or gray, which is the medium level of a picture signal in the video signal generated by the television cameras system 2 as shown in FIG. 6A; the identification code may be a combination of pulse signal levels and varying widths as shown in FIG. 6B.

Alternatively, the identification code signal may be either a sine-wave signal or a pulse signal having frequency corresponding to the identification code, the sine-wave or the pulse signal is generated during one or more horizontal scanning periods as shown in FIG. 6C, preferably during the vertical blanking period.

The control code generator 50 shown in FIG. 4 generates the control code signals in electronic shaped signals similar to the identification code signal shown in FIGS. 6A–6C. However, different shaped electrical signals may be applied to the control code signal and the identification code signal, similarly, the identification code incorporated in the control signal does not have to be identical to the identification code generated by the identification setting circuit 30 of the television camera of FIG. 3. Any code commensurating with the allotted identification to each television camera can be used instead of an identical identification code.

As shown in FIG. 3, the television camera system 2 further includes a code extraction circuit 34 for extracting a control code and an identification code transmitted from the control code or signal generator circuit 50 shown in FIG. 4, an identification code with an identification code fed from the setting circuit 30 for feeding match signal to a decoder 38 when both codes correspond to each other, and decoder 38 for decoding the control code fed from the code extraction circuit 34 and generating control commands corresponding to the decoded control code only when the decoder 38 is fed with a match signal from the identification code comparator 36.

Figure 7:
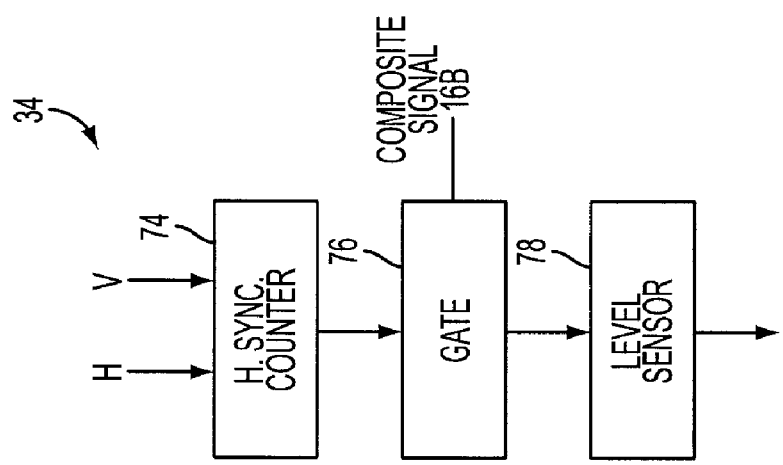
FIG. 7 is a block diagram of a code extraction circuit of the television camera shown in FIG. 3.

The code extraction circuit 34 of FIG. 7 includes a counter 74 for counting the number of horizontal synchronizing pulses during every field or frame of the video signal, a gate circuit 76 connected to the output of the counter 74 for outputting the video signal fed from transmission line 16 through terminal 16B when the counted value of the counter 74 is a predetermined value, and a level sensor 78 for sensing a signal level or for detecting the envelope of the signal fed from the gate circuit 76 to reproduce and output the code signal extracted from the video signal fed from transmission line 16.

The code comparing circuit 36 generates a match signal when the extracted code fed from the code extraction circuit 34 corresponds or is commensurate to the code set in the code setting circuit 30, and generates a mismatch signal when the extracted code fed from the code extraction circuit 34 does not correspond or is not commensurate to the code set in the code setting circuit 30.

Figure 8:
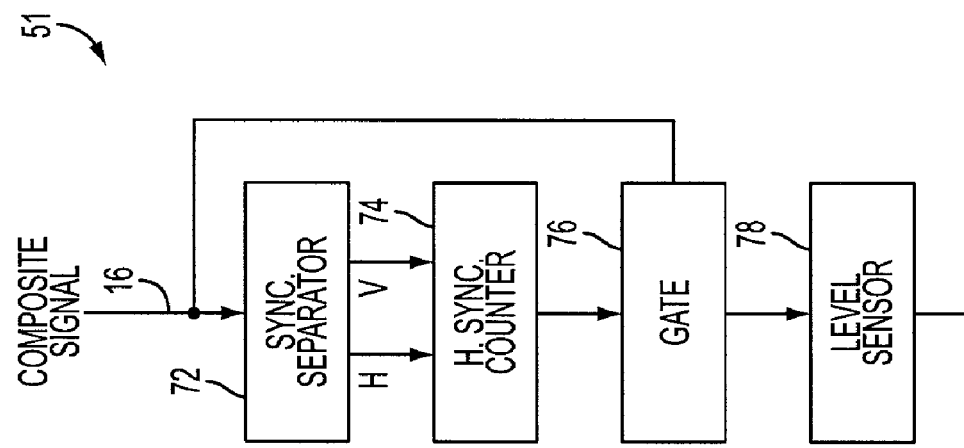
FIG. 8 is a block diagram of a code extraction circuit of the controller shown in FIG. 4.

Referring to FIG. 8, when using a control code and an identification code having the signal wave form shown in FIG. 6A or 6B, the code extraction circuit identified as 51 can be also composed of a synchronizing signal separator circuit 72 for separating the horizontal and the vertical synchronizing signals from a composite signal transmitted from the television camera system 2 fed through terminal 16A, a counter 74 for counting the number of horizontal scanning lines of the television camera for each field or frame, a gate circuit 76 for outputting the composite signal transmitted from the television camera only during a period of time when a counted value of the counter 74 is equal to a predetermined value, and a level sensor 78 for reproducing a code signal by sensing the level or the envelope of the output signal of the gate circuit 76.

When using a control code and an identification code having signal waveform shown in FIG. 6C the level sensor circuit may incorporate a frequency or pulse counter for counting the frequency or the number of pulses fed from the gate circuit 76.

The decoder 38 of the television camera system of FIG. 3 feeds different control commands to the micro processor circuit 21 which uses a well known micro processor ICs or digital ICs. The micro processor circuit 21 feeds the driver 22 for operating the television camera through the driver outputs D1, D2 and up to Dn by commanding the switching the superimposed crosshatch on-off, P.I.P on-off, tilting up-down, panning left-right, zooming tele-wide, focus near-far, iris open-close, P.I.P shift left or right, commanding the start or the stop of the transmission of a video signal, or switching-over the 2nd camera head from color to black/white or from black/white to color observation.

It has been apparent from the above description that a multipexer signal composed of the video signal consisting of the composite video signal, along with identification code respectively allotted to the television camera system 2 is transmitted from the television camera system 2 to the controller 40 through the video signal transmission line 16 and that coded control signal along with specific identification code signals and external synchronizing signals can be transmitted from the controller 40 to the television camera system 2 through the same video transmission line 16.

As shown in FIG. 1 and FIG. 2, the controller 40 feeds the video signal through terminal 16C to monitor 80 or to a video recorder (not shown). The monitor 80 is a well-known television receiver for displaying an image corresponding to the video signal transmitted from the television camera system 2. The video recorder (not shown) such as a well known video cassette recorder for recording and playing back the recorded video signal can be connected to terminal 16C for recording the video signal.

The controller 40 (FIG. 4) further includes a memory 41 for storing data for identifying each of the television camera system 2, 2n and 2n+1 of a given monitoring system and a superimposing circuit 42 for superimposing text or numerics or graphics for identifying the television camera system that is connected to the controller 40, on the basis of the code signal extracted from the code extraction circuit 51 constructed as shown in FIG. 8.

The extracted identification code fed from the code extraction circuit 51 is applied by the superimposing circuit 42 for reading out the stored data from the memory 41. The data fed from memory 41 to the superimposing circuit 42 is superimposed onto the video signal for displaying a numeric, text or graphics onto the monitor screen 82, enabling an operator to recognize the television camera system being used for the monitoring of the displayed picture. The superimposing circuit 41 also controls the superimposed display position and switching the display on and off through its control keys 42T, 42D and 42P. Such an apparatus for superimposing numeric text or graphics is disclosed in U.S. Pat. No. 4,943,864, the entire contents of which are incorporated herein by reference.

The PIP mixer processor superimposing circuit 23 shown in FIG. 3 further includes the superimposing circuit for superimposing selectively signs such as crosshatch or target mark at the centers or throughout the areas of the picture in picture on the basis of control commands generated by the control code generator 50 and fed to the television camera system via control line 18 or via transmission line 16.

The superimposing circuit 42 also generates graphic signs for superimposing such signs as crosshatch or target mark at the centers or throughout the areas of the picture in picture, providing the operator with means for targeting precisely upon the observed object. The superimposing of crosshatch or target sign is controlled and switched on-off via key 42C.

As a result, the operator can further superimpose any numeric, text or graphics into the displayed picture reproduced from the video signal.

Further, when the superimposed numeric, text or graphics obstruct the observed picture or the picture in picture, the operator can reposition the superimposed display or switch off the superimposed display from the monitor screen.

Figure 9A:
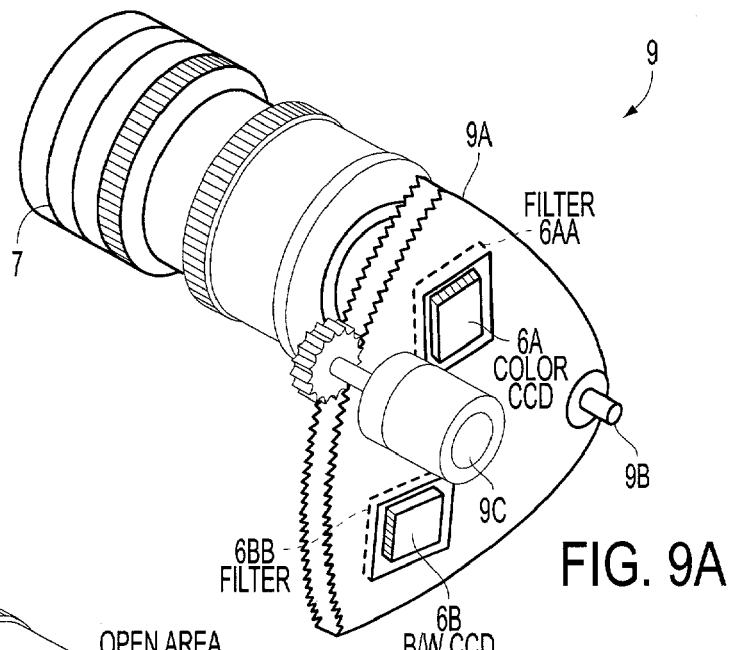
FIG. 9A is a partial perspective view of the CCDs switchover mechanism.

Shown in FIG. 9A is a mechanical switchover device 9 for switching over two CCDs 6A and 6B at the rear of the zoom lens 7 of the first television camera head 6 of FIG. 3, from color to black/white or from black/white to color. The geared switchover holder 9A to which the CCDs 6A and 6B and their filter 6AA and 6BB are attached is pivoted around the shaft 9B and is operated by a geared motor 9C. The motor 9C is driven through the output D3 of the driver 22 shown in FIG. 3, which commands the motor to rotate the holder 9A and position the black/white CCD 6B or the color CCD 6A, by rotating clockwise or counterclockwise the geared holder 9A, into the optical center and the focal point of the lens 7. The driver 22 may be activated directly by a command fed through the control line 18 or through the transmission line 16 via the decoder 38 and through the micro processor 21 of the CPU shown in FIG. 3.

Figure 9B:
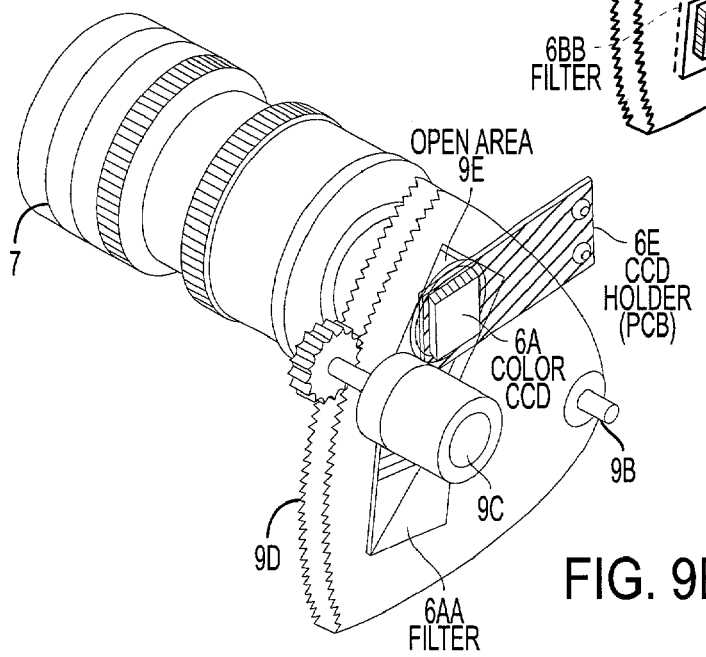
FIG. 9B is a partial perspective view showing the CCDs switchover mechanism with a CCD holder.

Instead of exchanging the two CCDs GA and 6B the geared holder 9D of FIG. 9B can be used for removing the filter 6AA from the color CCD GA. In this setup the CCD GA is affixed to a holder 6E, shown as a PCB, at the focal point behind the lens 7 and only the filter 6AA is attached to the geared holder 9D. By the setup shown in FIG. 9B the filter 6AA is rotated and inserted to a position between the CCD GA and the lens, or is rotated away, removed from the CCD, thereby exposing the CCD GA to the full spectrum of light passing through the lens 7 and the open area 9E of the holder 9D.

The two CCDs GA and 6B can be attached to the geared holder 9A with different types of filters such as 6AA and/or 6BB or without filters to provide a correlative observation of color and/or black/white in accordance with different illumination environments of the observed sites.

The switchover command from color to black/white or from black/white to color can be a manual command activated by an operator of the controller 40, or it can be set through an auto switchover mode program installed into the micro processor 21. The auto switchover mode can be one way only, from color to black/white, or two-way, from color to black/white and back to color.

The auto switchover from color to black/white is triggered by a signal or a flip-over of the output status, from low to high or high to low, of the sensor/comparator circuit 27. The output flip-over occurs when the signal fed from the first television camera head 6 via the connection line 12 and the selector S4 to the input of the sensor/comparator circuit 27 is lower than the threshold reference signal 27A shown in FIG. 3.

As the switchover mechanism 9 is activated and the black/white CCD 6B is in position and operated, or when a filter such as IR cut filter is removed, the sensitivity of the first camera head 6 is increased, increasing the level of the video signal fed to the sensor/comparator 27, to a point where its output status may flip back to high illumination status or color status.

Therefore to prevent an unstable state wherein the switching-over is repeatedly activated back and forth, the micro processor is programmed to command the selector S3 to switchover to the connection line 10, connecting the 2nd camera head 4 to the sensor/comparator input and to command a switchover back to color observation through the driver 22, only when the signals of both camera heads 4 and 6 are higher than the threshold reference level 27A.

The threshold reference 27A is shown as a fixed DC or AC levels, or as an adjustable reference, controlled by the micro processor 21 so as to provide specific programmed levels, commensurating with the observed site illumination environments and the specific sensitivities of the camera heads 4 and 6. Moreover, as the television camera system is rotated and repositioned, and is exposed to varying illumination conditions, the micro processor may control the selector S3 to repeatedly switchover back and forth the signals from the first camera head 6 to the second camera head 4 so that the sensor/comparator circuit will continuously update the micro processor with the illumination conditions throughout the camera surround and activate the color or black/white surveillance on a basis of a range of measured illumination data, gathered from one or both camera head signals.

The sensor/comparator circuit 27 can be a simple voltage comparator IC for spot signal comparisons, or it can comprise memory circuit for measuring part or all of the signals during a predetermined time for sensing the overall signal averages.

Even though only the first camera head 6 is shown to incorporate a day-night switchover mechanism, it is similarly possible to incorporate such switchover mechanism in the 2nd camera head 4, or in both camera heads.

When a camera system such as camera system 2 does not require PIP and does not employ 2nd camera head 4, but require an auto switchover from color to black/white and back to color such camera system can employ a wide angle photo transistor or pin diode, not shown, instead of the 2nd camera head 4. The wide angle photo transistor or pin diode can provide reasonable accurate signal levels, commensurating with the overall illumination level and feed the signal through the connection line 10, instead of the signal generated by the 2nd camera head 4, to the sensor/comparator circuit 27. In such case, a threshold reference commensurating with the signal fed from the photo transistor or the pin diode is set.

Similarly, it is possible to change the size of the CCDs of the switchover mechanism, such as setting ½" color CCD, which is more sensitive, for night observation and ¼" color CCD, which is less sensitive, for daytime observation. The CCD size is measured diagonally, and its actual diagonal size is for example, 8 mm for ½" and 4 mm for ¼". Therefore, the actual area of each sensing pixel of a ½" CCD is four times larger than the pixel of a ¼" CCD, (for equal number of pixels) which makes the ½" CCD far more sensitive than ¼" CCD. This is because the diagonal value is equal to 2R of the circled area of the lens back coverage, and since the sensing area is equal to $R^2 \times \pi$, therefore the radius of the ½" is 4 mm and that of the ¼" is 2 mm. Accordingly, the area of the ½" is $4^2 \times \pi$, which is four times larger than the area of the ¼", which is $2^2 \times \pi$. The same applies to any other CCD sizes such as ⅔" and ⅓" or 1" and ½" etc.

Figure 9C:
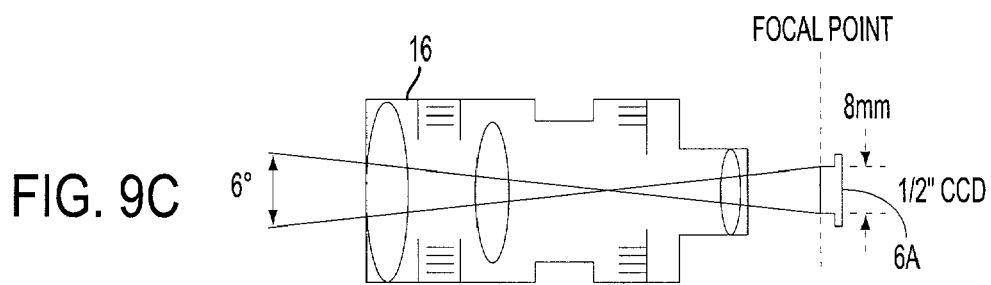
FIGS. 9C and 9D are side views showing the lens corresponding to angle of view.
Figure 9D:
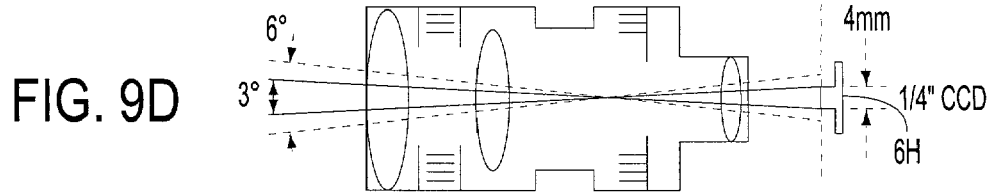

Furthermore, the switching-over for example, from a larger CCD such as ½" (8 mm) to a smaller CCD such as ¼" (4 mm) cuts the angle of view of the lens by half, or doubles the lens power by two. In the example shown in FIGS. 9C and 9D, the telephoto lens 7 has an angle of view of 6° and it covers at its back focal point 8 mm circle (diagonal size of the ½" CCD 6A) shown in FIG. 9C, and the replacing of the ½" CCD 6A by a ¼" CCD 6H shown in FIG. 9D, with only 4 mm (diagonal), cuts the 6° angle of view of the telephoto lens 7 by half to 3°. This is equal to doubling of the lens telephoto power.

Though the switchover mechanism 9 shown in FIG. 9A shows only two CCDs 6A and 6B and two filters 6AA and 6BB, it is obvious that a combination of more than two CCDs in different format and sizes, along with different filters and/or without filters can be attached to a geared holder similar to the geared holders 9A and 9D.

It becomes apparent that the method of switching over different CCD sizes of the apparatus for identifying the scene location enables the increase or decrease of the lens angle of view along with the camera head sensitivities, or to switch the signal from color to black/white and from black/white to color, thereby, to offer overall correlative improvement in observation during daytime, or night time or under specific illuminations and requirement of angle of views, along with range finding using the PIP facilities.

It should be understood, of course, that the foregoing disclosure relates to only a preferred embodiment of the invention and that it is intended to cover all changes and modifications of the example of the invention herein chosen for the purpose of the disclosure, which modifications do not constitute departures from the spirit and scope of the invention.

What is claimed is:

1. A remotely operated television camera system for identifying a viewed scene, the system comprising:
   a first television camera including narrow angle lens selected from a group consisting of fixed focal lens, vary focal lens and zoom lens adapted to be remotely operated for observing said viewed scene;
   a second television camera joined to said first television camera including wide angle lens selected from a group consisting of fixed focal lens, vary focal lens and zoom lens, said first and said second television cameras are optically targeted toward same scene;
   a pan and tilt device for positioning said first and second television cameras jointly;
   said first television camera including at least one imaging device selected from a group consisting of imager with smaller diagonal size, imager with larger diagonal size, black and white imager, color imager, IR imager, color and black and white dual imager, color and IR dual imager, black and white and IR dual imager and at least one optical filter selected from a group consisting of color pass filter, IR cut filter, neutral filter;
   Said first television camera including a mechanical device for repositioning a combination of said imaging device and said optical filter into the optical path of said narrow angle lens for switching-over the viewing modes selected from a group consisting of color to black and white mode, color to IR mode, color to black and white to IR mode, color to IR to black and white mode, black and white to IR mode, black and white to color mode, black and white to color to IR mode, black and white to IR to color mode, IR to color mode, IR to black and white mode, IR to black and white to color mode, and IR to color to black and white mode;
   said processor including signal combining circuit for processing and combining video signals generated by said first television camera and by said second television camera for outputting a combined video signal composed of a wide angle sub-picture of said scene viewed by said second television camera inside a arrow angle main picture of said scene viewed by said first television camera, wherein said sub-picture occupies a small area inside said main picture; said processor including a sensing and comparing circuit for said video signals generated by said first television camera and said second television camera, for detecting one of a low comparative video signal and a high comparative video signal by comparing said video signals to reference signals, wherein said processor activates said switching-over to a selected viewing mode selected from a group consisting of from color to black and white, from color to IR and from black and white to IR when said sensing and comparing circuit detects a low comparative video signal generated by said first television camera, and switching-back to the prior selected viewing mode selected from a group consisting of back to color from black and white, back to color from IR end back to black and white from IR when said sensing and comparing circuit detects a high comparative video signal generated by said second television camera.

2. The system according to claim 1, wherein said at least one imaging device is a dual imager selected from a group consisting of said color and Black and white dual imager, said color and IR dual imager and said black and white and IR dual imager and said optical filter is said IR cut filter; wherein said mechanical device includes a filter holder for positioning said IR cut filter into said optical path for switching-over the viewing modes selected from a group consisting of said IR to color mode, IR to black and white mode and Black and white to color mode and for removing said IR cut filter from said optical path for switching back said viewing modes selected from a group consisting of back to IR from color, back to IR from black and white and back to color from black and white.

3. The system according to claim 1, wherein said at least one imaging device is a combination of said imager with smaller diagonal size and said imager with larger diagonal size; wherein said mechanical device switches-over from said imager with smaller diagonal size to said imager with larger diagonal size for increasing the angle of view of said narrow angle lens and from said imager with larger diagonal size to said imager with smaller diagonal size for decreasing the angle of view of said narrow angle lens.

4. The system according to claim 1, wherein said signal combining circuit for combining video signals outputs a reversed combined signal composed of said narrow angle sub-picture in said wide angle main picture.

5. The system according to claim 2, wherein said signal combining circuit for combining video signals outputs a reversed combined signal composed of said narrow angle sub-picture in said wide angle main picture.

6. The system according to claim 3, wherein said signal combining circuit for combining video signals outputs a reversed combined signal composed of said narrow angle sub-picture in said wide angle main picture.

7. The system according to claim 1, wherein said signal combining circuit selectively outputs said video signal generated by said first television camera, said video signal generated by said second television camera, said combined signal composed of said wide angle sub-picture in said narrow angle main picture, and said combined signal composed of said narrow angle sub-picture in said wide angle main picture.

8. The system according to claim 2, wherein said signal combining circuit selectively outputs said video signal generated by said first television camera, said video signal generated by said second television camera, said combined signal composed of said wide angle sub-picture in said narrow angle main picture, and said combined signal composed of said narrow angle sub-picture in said wide angle main picture.

9. The system according to claim 3, wherein said signal combining circuit selectively outputs said video signal generated by said first television camera, said video signal generated by said second television camera, said combined signal composed of said wide angle sub-picture in said narrow angle main picture, and said combined signal composed of said narrow angle sub-picture in said wide angle main picture.

10. The system according to claim 1, wherein said camera system includes an internal synchronizing generator for feeding internal synchronizing signals to said first television camera, said second television camera and said signal combining circuit for providing smooth undisturbed combining process of said combined video signal.

11. The system according to claim 2, wherein said camera system includes an internal synchronizing generator for feeding internal synchronizing signals to said first television camera, said second television camera and said signal combining circuit for providing smooth undisturbed combining process of said combined video signal.

12. The system according to claim 3, wherein said camera system includes an internal synchronizing generator for feeding internal synchronizing signals to said first television camera, said second television camera and said signal combining circuit for providing smooth undisturbed combining process of said combined video signal.

13. The system according to claim 1 further comprising a receiver including a controller; a transmission line for propagating control commands generated by said controller to said camera system and said combined signal to said receiver, wherein said control commands propagated to said camera system including commands for switching-over said viewing modes.

14. The system according to claim 2 further comprising a receiver including a controller; a transmission line for propagating control commands generated by said controller to said camera system and said combined signal to said receiver, wherein said control commands propagated to said camera system including commands for switching-over said viewing modes.

15. The system according to claim 3 further comprising a receiver including a controller; a transmission line for propagating control commands generated by said controller to said camera system and said combined signal to said receiver, wherein said control commands propagated to said camera system including commands for switching-over said viewing modes.

16. The system according to claim 7 further comprising a receiver including a controller; a transmission line for propagating control commands generated by said controller to said camera system and said video signal and said combined signal to said receiver, wherein said control commands propagated to said camera system including commands for switching-over said viewing modes and commands for selectively outputting said video signal generated by said first television camera, said video signal generated by said second television camera, said combined signal composed of said wide angle sub-picture in said narrow angle main picture, and said combined signal composed of said narrow angle sub-picture in said wide angle main picture.

17. The system according to claim 8 further comprising a receiver including a controller a transmission line for propagating control commands generated by said controller to said camera system and said video signal and said combined signal to said receiver, wherein said control commands propagated to said camera system including commands for switching-over said viewing modes and commands for selectively outputting said video signal generated by said first television camera, said video signal generated by said second television camera, said combined signal composed of said wide angle sub-picture in said narrow angle main picture, and said combined signal composed of said narrow angle sub-picture in said wide angle main picture.

18. The system according to claim 9 further comprising a receiver including a controller a transmission line for propagating control commands generated by said controller to said camera system and said video signal and said combined signal to said receiver, wherein said control commands propagated to said camera system including commands for switching-over said viewing modes and commands for selectively outputting said video signal generated by said first television camera, said video signal generated by said second television camera, said combined signal composed of said wide angle sub-picture in said narrow angle main picture, and said combined signal composed of said narrow angle sub-picture in said wide angle main picture.

19. The system according to claim 13 further comprising an external synchronizing device for externally synchronizing said camera system, said external synchronizing device including an external synchronizing signal generator circuit feeding said transmission line with an external synchronizing pulse signal having a voltage level higher than a maximum voltage level or lower than a minimum voltage level of said video signals, and wherein said camera system incorporates a comparator circuit for separating said pulse signal propagated over said transmission line from said video signals by comparing said video signals to a reference signal and applying said separated pulse signal to said internal synchronizing generator for externally synchronizing said camera system.

20. The system according to claim 14 further comprising an external synchronizing device for externally synchronizing said camera system, said external synchronizing device including an external synchronizing signal generator circuit feeding said transmission line with an external synchronizing pulse signal having a voltage level higher than a maximum voltage level or lower than a minimum voltage level of said video signals, and wherein said camera system incorporates a comparator circuit for separating said pulse signal propagated over said transmission line from said video signals by comparing said video signals to a reference signal and applying said separated pulse signal to said internal synchronizing generator for externally synchronizing said camera system.

21. The system according to claim 15 further comprising an external synchronizing device for externally synchronizing said camera system, said external synchronizing device including an external synchronizing signal generator circuit feeding said transmission line with an external synchronizing pulse signal having a voltage level higher than a maximum voltage level or lower than a minimum voltage level of said video signals, and wherein said camera system incorporates a comparator circuit for separating said pulse signal propagated over said transmission line from said video signals by comparing said video signals to a reference signal and applying said separated pulse signal to said internal synchronizing generator for externally synchronizing said camera system.

22. The system according to claim 16 further comprising an external synchronizing device for externally synchronizing said camera system, said external synchronizing device including an external synchronizing signal generator circuit feeding said transmission line with an external synchronizing pulse signal having a voltage level higher than a maximum voltage level or lower than a minimum voltage level of said video signals, and wherein said camera system incorporates a comparator circuit for separating said pulse signal propagated over said transmission line from said video signals by comparing said video signals to a reference signal and applying said separated pulse signal to said internal synchronizing generator for externally synchronizing said camera system.

23. The system according to claim 17 further comprising an external synchronizing device for externally synchronizing said camera system, said external synchronizing device including an external synchronizing signal generator circuit feeding said transmission line with an external synchronizing pulse signal having a voltage level higher than a maximum voltage level or lower than a minimum voltage level of said video signals, and wherein said camera system incorporates a comparator circuit for separating said pulse signal propagated over said transmission line from said video signals by comparing said video signals to a reference signal and applying said separated pulse signal to said internal synchronizing generator for externally synchronizing said camera system.

24. The system according to claim 18 further comprising an external synchronizing device for externally synchronizing said camera system, said external synchronizing device including an external synchronizing signal generator circuit feeding said transmission line with an external synchronizing pulse signal having a voltage level higher than a maximum voltage level or lower than a minimum voltage level of said video signals, and wherein said camera system incorporates a comparator circuit for separating said pulse signal propagated over said transmission line from said video signals by comparing said video signals to a reference signal and applying said separated pulse signal to said internal synchronizing generator for externally synchronizing said camera system.

25. A remotely operated television camera system for identifying a viewed scene, the system comprising:
  a first television camera including narrow angle lens selected from a group consisting of fixed focal lens, vary focal lens and zoom lens adapted to be remotely operated for observing said viewed scene;
  an illumination sensor joined to said first television camera including wide angle lens selected from a group consisting of fixed focal lens, vary focal lens and zoom lens, said first television camera and said illumination sensor are optically targeted toward same scene;
  a pan and tilt device for positioning said first and said illumination sensor jointly, said first television camera including at least one imaging device selected from a group consisting of imager with smaller diagonal size, imager with larger diagonal size, black and white imager, color imager, IR imager, color and black and white dual imager, color and IR dual imager, black and white and IR dual imager and at least one optical filter selected from a group consisting of color pass filter, IR cut filter, neutral filter;
  said first television camera including a mechanical device for repositioning a combination of said imaging device and said optical filter into the optical path of said narrow angle lens for switching-over the viewing modes selected from a group consisting of color to black and white mode, color to IR mode, color to black and white to IR mode, color to IR to black and white mode, black and white to IR mode, black and white to color mode, black and white to color to IR mode, black and white to IR to color mode, IR to color mode, IR to black and white mode, IR to black and white to color mode, and IR to color to black and white mode;
  a processor including a sensing and comparing circuit for the video signal generated by said first television camera and for the illumination signal generated by said illumination sensor, for detecting one of a low comparative video signal and a high comparative illumination signal by comparing said video signal and said illumination signal to reference signals, wherein said processor activates said switching-over to a selected viewing mode selected from a group consisting of from color to black and white, from color to IR and from black and white to IR when said sensing and comparing circuit detects a low comparative video signal generated by said first television camera, and switching-back to the prior selected viewing mode selected from a group consisting of back to color from blank and white, back to color from IR and back to black and white from IR when said sensing and comparing circuit detects a high comparative illumination signal generated by said illumination sensor.

26. The system according to claim 25, wherein said at least one imaging device is a dual imager selected from a group consisting of said color and Black and white dual imager, said color and IR dual imager and said black and white and IR dual imager and said optical filter is said IR cut filter;
  wherein said mechanical device includes a filter holder for positioning said IR cut filter into said optical path for switching-over the viewing modes selected from a group consisting of said IR to color mode, IR to black and white mode and Black and white to color mode and for removing said IR cut filter from said optical path for switching back said viewing modes selected from a group consisting of back to IR from color, back to IR from black and white and back to color from black and white.

27. The system according to claim 25, wherein said at least one imaging device is a combination of said imager with smaller diagonal size and said imager with larger diagonal size;
  wherein said mechanical device switches-over from said imager with smaller diagonal size to said imager with larger diagonal size for increasing the angle of view of said narrow angle lens and from said imager with larger diagonal size to said imager with smaller diagonal size for decreasing the angle of view of said narrow angle lens.

28. The system according to claim 25 further comprising a receiver including a controller a transmission line for propagating control commands generated by said controller to said camera system and said video signal to said receiver, wherein said control commands propagated to said camera system including commands for switching-over said viewing modes.

29. The system according to claim 26 further comprising a receiver including a controller; a transmission line for propagating control commands generated by said controller to said camera system and said video signal to said receiver, wherein said control commands propagated to said camera system including commands for switching-over said viewing modes.

30. The system according to claim 27 further comprising a receiver including a controller; a transmission line for propagating control commands generated by said controller to said camera system and said video signal to said receiver, wherein said control commands propagated to said camera system including commands for switching-over said viewing modes.

31. The system according to claim 28 further comprising an external synchronizing device for externally synchronizing said camera system, said external synchronizing device including an external synchronizing signal generator circuit feeding said transmission line with an external synchronizing pulse signal having a voltage level higher than a maximum voltage level or lower than a minimum voltage level of said video signals, and wherein said camera system incorporates a comparator circuit for separating said pulse signal propagated over said transmission line from said video signals by comparing said video signals to a reference signal and applying said separated pulse signal to an internal synchronizing generator for externally synchronizing said camera system.

32. The system according to claim 29 further comprising an external synchronizing device for externally synchronizing said camera system, said external synchronizing device including an external synchronizing signal generator circuit feeding said transmission line with an external synchronizing pulse signal having a voltage level higher than a maximum voltage level or lower than a minimum voltage level of said video signals, and wherein said camera system incorporates a comparator circuit for separating said pulse signal propagated over said transmission line from said video signals by comparing said video signals to a reference signal and applying said separated pulse signal to an internal synchronizing generator for externally synchronizing said camera system.

33. The system according to claim 30 further comprising an external synchronizing device for externally synchronizing said camera system, said external synchronizing device including an external synchronizing signal generator circuit feeding said transmission line with an external synchronizing pulse signal having a voltage level higher than a maximum voltage level or lower than a minimum voltage level of said video signals, and wherein said camera system incorporates a comparator circuit for separating said pulse signal propagated over said transmission line from said video signals by comparing said video signals to a reference signal and applying said separated pulse signal to an internal synchronizing generator for externally synchronizing said camera system.

34. The system according to claim 1, wherein said second television camera further includes at least one imaging device selected from a group consisting of imager with smaller diagonal size, imager with larger diagonal size, black and white imager, color imager, IR imager, color and black and white dual imager, color and IR dual imager, black and white and IR dual imager and at least one optical filter selected from a group consisting of color pass filter, IR cut filter, neutral filter; the system further comprising a mechanical device for repositioning a combination of said imaging device and said optical filter into the optical pat of said narrow angle lens for switching-over the viewing modes selected from a group consisting of color to black and white mode, color to IR mode, color to black and white to IR mode, color to IR to black and white mode, black and white to IR mode, black and white to color mode, black and white to color to IR mode, black and white to IR to color mode, IR to color mode, IR to black and white mode, IR to black and white to color mode, and IR to color to black and white mode; and wherein said processor activates said switching-over of said selected viewing modes of said second television camera jointly with said viewing modes of said first television camera.

35. The system according to claim 2, wherein said second television camera further includes at least one imaging device selected from a group consisting of imager with smaller diagonal size, imager with larger diagonal size, black and white imager, color imager, IR imager, color and black and white dual imager, color and IR dual imager, black and white and IR dual imager and at least one optical filter selected from a group consisting of color pass filter, IR cut filter, neutral filter; the system further comprising a mechanical device for repositioning a combination of said imaging device and said optical filter into the optical path of said narrow angle lens for switching-over the viewing modes selected from a group consisting of color to black and white mode, color to IR mode, color to black and white to IR mode, color to IR to black and white mode, black and white to IR mode, black and white to color mode, black and white to color to IR mode, black and white to IR to color mode, IR to color mode, IR to black and white mode, IR to black and white to color mode, and IR to color to black and white mode; and wherein said processor activates said switching-over of said selected viewing modes of said second television camera jointly with said viewing modes of said first television camera.

36. The system according to claim 3, wherein said second television camera further includes at least one imaging device selected from a group consisting of imager with smaller diagonal size, imager with larger diagonal size, black and white imager, color imager, IR imager, color and black and white dual imager, color and IR dual imager, black and white and IR dual imager and at least one optical filter selected from a group consisting of color pass filter, IR cut filter, neutral filter;

a mechanical device for repositioning a combination of said imaging device and said optical filter into the optical pat of said narrow angle lens for switching-over the viewing modes selected from a group consisting of color to black and white mode, color to IR mode, color to black and white to IR mode, color to IR to black and white mode, black and white to IR mode, black and white to color mode, black and white to color to IR mode, black and white to IR to color mode, IR to color mode, IR to black and white mode, IR to black and white to color mode, and IR to color to black and white mode; and wherein said processor activates said switching-over of said selected viewing modes of said second television camera jointly with said viewing modes of said first television camera.

37. The system according to claim 13, wherein said second television camera further includes at least one imaging device selected from a group consisting of imager with smaller diagonal size, imager with larger diagonal size, black and white imager, color imager, IR imager, color and black and white dual imager, color and IR dual imager, black and white and IR dual imager and at least one optical filter selected from a group consisting of color pass filter, IR cut filter, neutral filter;
   a mechanical device for repositioning a combination of said imaging device and said optical filter into the optical path of said narrow angle lens for switching-over the viewing modes selected from a group consisting of color to black and white mode, color to IR mode, color to black and white to IR mode, color to IR to black and white mode, black and white to IR mode, black and white to color mode, black and white to color to IR mode, black and white to IR to color mode, IR to color mode, IR to black and white mode, IR to black and white to color mode, and IR to color to black and white mode; and
   wherein said controller generates separate commands for said switching-over of said selected viewing modes of said second television camera and said viewing modes of said first television camera.

38. The system according to claim 14, wherein said second television camera further includes at least one imaging device selected from a group consisting of imager with smaller diagonal size, imager with larger diagonal size, black and white imager, color imager, IR imager, color and black and white dual imager, color and IR dual imager, black and white and IR dual imager and at least one optical filter selected from a group consisting of color pass filter, IR cut filter, neutral filter;
   the system further comprising a mechanical device for repositioning a
   combination of said imaging device and said optical filter into the optical path of said narrow angle lens for switching-over the viewing modes selected from a group consisting of color to black and white mode, color to IR mode, color to black and white to IR mode, color to IR to black and white mode, black and white to IR mode, black and white to color mode, black and white to color to IR mode, black and white to IR to color mode, IR to color mode, IR to black and white mode, IR to black and white to color mode, and IR to color to black and white mode; and
   wherein said controller generate separate commands for said switching-over of said selected viewing modes of said second television camera and said viewing modes of said first television camera.

39. The system according to claim 15, wherein said second television camera further includes at least one imaging device selected from a group consisting of imager with smaller diagonal size, imager with larger diagonal size, black and white imager, color imager, IR imager, color and black and white dual imager, color and IR dual imager, black and white and IR dual imager and at least one optical filter selected from a group consisting of color pass filter, IR cut filter, neutral filter;
   the system further comprising a mechanical device for repositioning a combination of said imaging device and said optical filter into the optical path of said narrow angle lens for switching-over the viewing modes selected from a group consisting of color to black and white mode, color to IR mode, color to black and white to IR mode, color to IR to black and white mode, black and white to IR mode, black and white to color mode, black and white to color to IR mode, black and white to IR to color mode, IR to color mode, IR to black and white mode, IR to black and white to color mode, and IR to color to black and white mode; and
   wherein said controller generated separate commands for said switching-over of said selected viewing modes of said second television camera and said viewing modes of said first television camera.

40. The system according to claim 7 further comprising a plurality of said television camera system; wherein each said processor of each said television camera system further including a code signal generating circuit for generating identification code signals allotted to each respective said television camera system;
   a receiver including a controller for selectively receiving said video signals, said combined signal, said reversed combined signal and said identification code signal and for remotely operating said television camera system, said controller including a control circuit for selecting and controlling each said television camera system, and an identification code decoder for decoding said identification code signal; transmission lines for connecting said plurality of television camera systems with said receiver;
   said control circuit including a control code generator for generating coded commands signal combined with a code signal corresponding to said identification code received by said receiver and for transmitting a combined control signals to said respective television camera system;
   each television camera system further including a decoder circuit for decoding said combined control signals and for operating said respective television camera system on the basis of the received command, when said code decoded by said decoder coincides with said identification code allotted to said respective television camera system.

41. The system according to claim 40, wherein said at least one imaging device is a dual imager selected from a group consisting of said color and Black and white dual imager, said color and IR dual imager and said black and white and IR dual imager and said optical filter is said IR cut filter;
   wherein said mechanical device includes a filter holder for positioning said IR cut filter into said optical pat for switching-over the viewing modes selected from a group consisting of said IR to color mode, IR to black and white mode and Black and white to color mode and for removing said IR cut filter from said optical path for switching back said viewing modes selected from a group consisting of back to IR from color, back to IR front black and white and back to color from black and white.

42. The system according to claim 40, wherein said at least one imaging device is a combination of said imager with smaller diagonal size and said imager with larger diagonal size;
   wherein said mechanical device switches-over from said imager with smaller diagonal size to said imager with larger diagonal size for increasing the angle of view of said narrow angle lens and from said imager with larger diagonal size to said imager with smaller diagonal size for decreasing the angle of view of said narrow angle lens.

43. The system according to claim 40, wherein each said camera system includes an internal synchronizing generator for feeding internal synchronizing signals to said first television camera, said second television camera and said signal combining circuit for providing smooth undisturbed combining process of said combined video signal.

44. The system according to claim 41, wherein each said camera system includes an internal synchronizing generator for feeding internal synchronizing signals to said first television camera, said second television camera and said signal combining circuit for providing smooth undisturbed combining process of said combined video signal.

45. The system according to claim 42, wherein each said camera system includes an internal synchronizing generator for feeding internal synchronizing signals to said first television camera, said second television camera and said signal combining circuit for providing smooth undisturbed combining process of said combined video signal.

46. The system according to claim 40 further comprising an external synchronizing device for externally synchronizing said camera system, said external synchronizing device including an external synchronizing signal generator circuit feeding said transmission line with an external synchronizing pulse signal having a voltage level higher than a maximum voltage level or lower than a minimum voltage level of said video signals, and wherein said camera system incorporates a comparator circuit for separating said pulse signal propagated over said transmission line from said video signals by comparing said video signals to a reference signal and applying said separated pulse signal to said internal synchronizing generator for externally synchronizing said plurality of television camera system.

47. The system according to claim 43 further comprising an external synchronizing device for externally synchronizing said camera system, said external synchronizing device including an external synchronizing signal generator circuit feeding said transmission line with an external synchronizing pulse signal having a voltage level higher than a maximum voltage level or lower than a minimum voltage level of said video signals, and wherein said camera system incorporates a comparator circuit for separating said pulse signal propagated over said transmission line from said video signals by comparing said video signals to a reference signal and applying said separated pulse signal to said internal synchronizing generator for externally synchronizing said plurality of television camera system.

48. The system according to claim 44 further comprising an external synchronizing device for externally synchronizing said camera system, said external synchronizing device including an external synchronizing signal generator circuit feeding said transmission line with an external synchronizing pulse signal having a voltage level higher than a maximum voltage level or lower than a minimum voltage level of said video signals, and wherein said camera system incorporates a comparator circuit for separating said pulse signal propagated over said transmission line from said video signals by comparing said video signals to a reference signal and applying said separated pulse signal to said internal synchronizing generator for externally synchronizing said plurality of television camera system.

49. The system according to claim 40, wherein said identification code decoder further includes a memory for storing data pertaining to each allotted identification code, and a superimposing circuit for retrieving said data from said memory for selectable superimposing upon command said data along with selectable graphic signs including one of a cross hatch and a target mark onto said video signals.

50. The system according to claim 41, wherein said identification code decoder further includes a memory for storing data pertaining to each allotted identification code, and a superimposing circuit for retrieving said data from said memory for selectable superimposing upon command said data along with selectable graphic signs including one of a cross hatch and a target mark onto said video signals.

51. The system according to claim 42, wherein said identification code decoder further includes a memory for storing data pertaining to each allotted identification code, and a superimposing circuit for retrieving said data from said memory for selectable superimposing upon command said data along with selectable graphic signs including one of a cross hatch and a target mark onto said video signals.

52. The system according to claim 25 further comprising a plurality of said television camera system; wherein each said processor of each said television camera system further including a code signal generating circuit for generating identification code signals allotted to each respective said television camera system; a receiver including a controller for receiving said video signals and said identification code signal and for remotely operating said television camera system, said controller including a control circuit for selecting and controlling each said television camera system, and an identification code decoder for decoding said identification code signal;

transmission lines for connecting said plurality of television camera systems with said receiver;

said control circuit including a control code generator for generating coded commands signal combined with a code signal corresponding to said identification code received by said receiver and for transmitting a combined control signals to said respective television camera system;

each television camera system further including a decoder circuit for decoding said combined control signals and for operating said respective television camera system on the basis of the received command, when said code decoded by said decoder coincides with said identification code allotted to said respective television camera system.

53. The system according to claim 52, wherein said at least one imaging device is a dual imager selected from a group consisting of said color and Black and white dual imager, said color and IR dual imager and said black and white and IR dual imager and said optical filter is said IR cut filter;

wherein said mechanical device includes a filter holder for positioning said IR cut filter into said optical path for switching-over the viewing modes selected from a group consisting of said IR to color mode, IR to black and white mode and Black and white to color mode and for removing said IR cut filter from said optical path for switching back said viewing modes selected from a group consisting of back to IR from color, back to IR from black and white and back to color from black and white.

54. The system according to claim 52, wherein said at least one imaging device is a combination of said imager with a smaller diagonal size and said imager with a larger diagonal size;

wherein said mechanical device switches-over from said imager with smaller diagonal size to said imager with larger diagonal size for increasing the angle of view of said narrow angle lens and from said imager with larger diagonal size to said imager with smaller diagonal size for decreasing the angle of view of said narrow angle lens.

55. The system according to claim 52 further comprising an external synchronizing device for externally synchronizing said camera system, said external synchronizing device including an external synchronizing signal generator circuit feeding said transmission line with an external synchronizing pulse signal having a voltage level higher than a maximum voltage level or lower than a minimum voltage level of said video signals, and wherein said camera system incorporates a comparator circuit for separating said pulse signal propagated over said transmission line from said video signals by comparing said video signals to a reference signal and applying said separated pulse signal to an internal synchronizing generator for externally synchronizing said plurality of television camera system.

56. The system according to claim 53 further comprising an external synchronizing device for externally synchronizing said camera system, said external synchronizing device including an external synchronizing signal generator circuit feeding said transmission line with an external synchronizing pulse signal having a voltage level higher than a maximum voltage level or lower than a minimum voltage level of said video signals, and wherein said camera system incorporates a comparator circuit for separating said pulse signal propagated over said transmission line from said video signals by comparing said video signals to a reference signal and applying said separated pulse signal to an internal synchronizing generator for externally synchronizing said plurality of television camera system.

57. The system according to claim 54, further comprising an external synchronizing device for externally synchronizing said camera system, said external synchronizing device including an external synchronizing signal generator circuit feeding said transmission line with an external synchronizing pulse signal having a voltage level higher than a maximum voltage level or lower than a minimum voltage level of said video signals, and wherein said camera system incorporates a comparator circuit for separating said pulse signal propagated over said transmission line from said video signals by comparing said video signals to a reference signal and applying said separated pulse signal to an internal synchronizing generator for externally synchronizing said plurality of television camera system.

58. The system according to claim 52, wherein said identification code decoder further includes a memory for storing data pertaining to each allotted identification code, and a superimposing circuit for retrieving said data from said memory for selectable superimposing upon command said data along with selectable graphic signs including one of a cross hatch and a target mark onto said video signals.

59. The system according to claim 53, wherein said identification code decoder further includes a memory for storing data pertaining to each allotted identification code, and a superimposing circuit for retrieving said data from said memory for selectable superimposing upon command said data along with selectable graphic signs including one of a cross hatch and a target mark onto said video signals.

60. The system according to claim 54, wherein said identification code decoder further includes a memory for storing data pertaining to each allotted identification code, and a superimposing circuit for retrieving said data from said memory for selectable superimposing upon command said data along with selectable graphic signs including one of a cross hatch and a target mark onto said video signals.

* * * * *

UNITED STATES PATENT AND TRADEMARK OFFICE
CERTIFICATE OF CORRECTION

PATENT NO. : 7,071,971 B2 Page 1 of 1
APPLICATION NO. : 10/043897
DATED : July 4, 2006
INVENTOR(S) : David Elberbaum It is certified that error appears in the above-identified patent and that said Letters Patent is hereby corrected as shown below:

Title Page, item (63) should read

-- (63) Continuation-in-part of application No. 08/918,220, filed on August 25, 1997 --

Signed and Sealed this

Thirtieth Day of January, 2007

JON W. DUDAS
*Director of the United States Patent and Trademark Office*